UNITED STATES PATENT OFFICE.

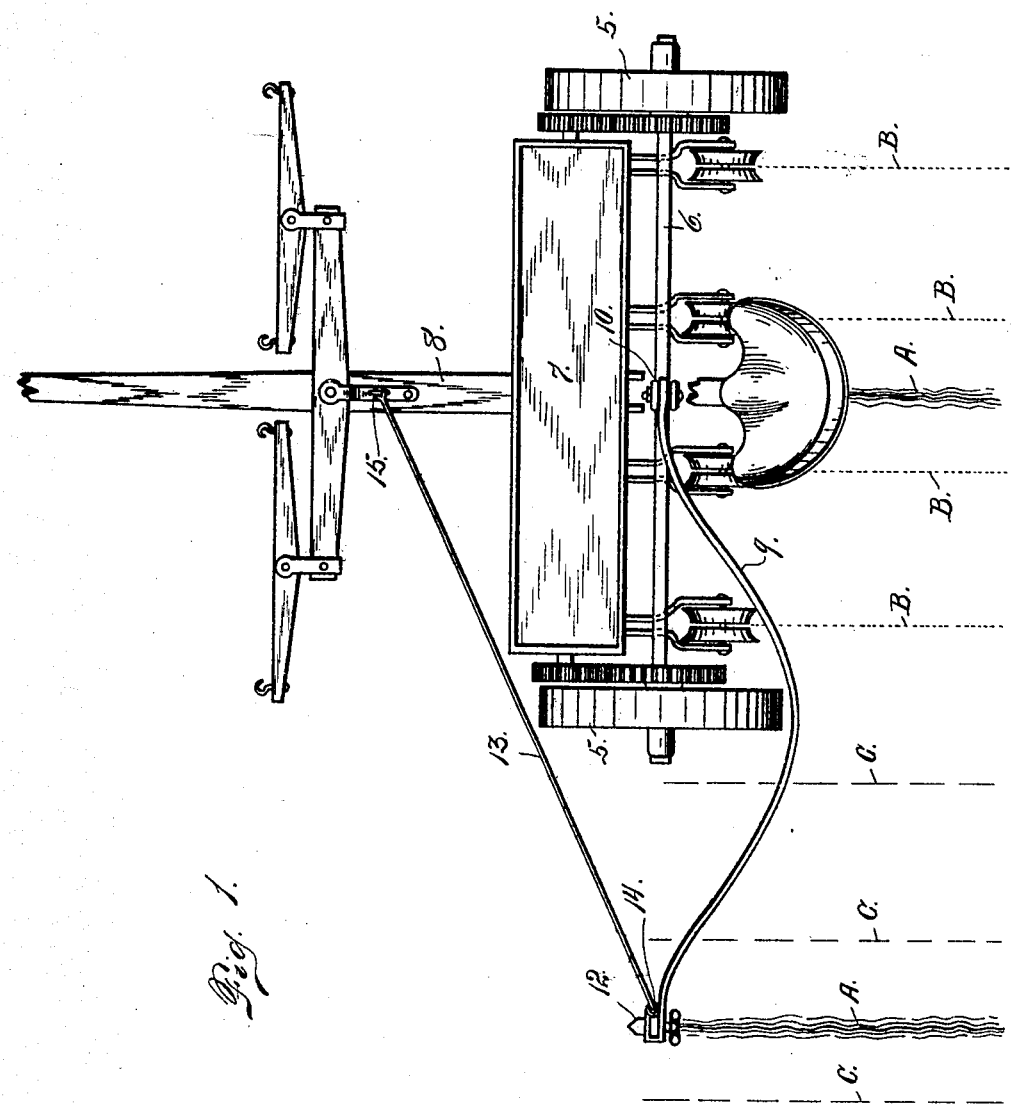

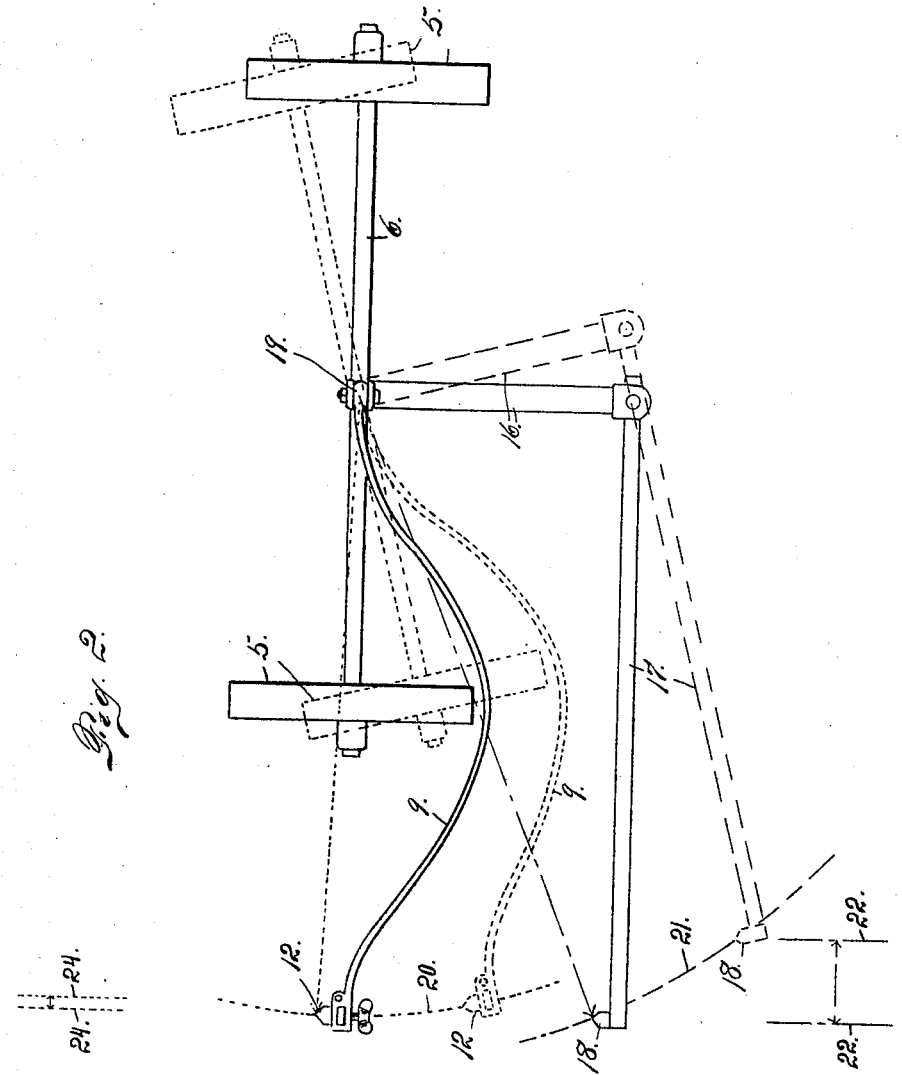

AUGUST F. BUCK, OF GRANADA, COLORADO.

MARKER ATTACHMENT FOR PLANTERS.

No. 913,098.          Specification of Letters Patent.          Patented Feb. 23, 1909.

Application filed July 15, 1907. Serial No. 383,827.

*To all whom it may concern:*

Be it known that I, AUGUST F. BUCK, a citizen of the United States, residing at Granada, in the county of Prowers and State of Colorado, have invented certain new and useful Improvements in Marker Attachments for Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in marker attachments for seeding machines. In machines for planting corn, beets and other crops which are grown in rows, it is customary to use horse planters or machines mounted on ground wheels and drawn across the field by horses usually planting a number of rows at a time. It is customary to employ in connection with planters of this character, a marker which projects laterally from the machine and makes a mark in the ground to form a guide for the driver of the machine on the return trip across the field. These markers so far as I am aware have always been so constructed that the marking device proper or shoe which engages the ground and makes the mark, has been located either in the front or rear of the vertical axis of the machine or the axis upon which the machine would rotate if turned without forward travel in any direction. As the machine is drawn across the field, one wheel or the other is occasionally obstructed causing the tongue to swing, and the body of the machine to turn a short distance upon what I have termed its vertical axis. Where the marker extends outwardly or laterally from the machine either in the front or rear of this vertical center, a slight movement of the machine due to the swinging of the tongue or the turning of the machine on its vertical center, causes a considerable irregularity in the mark, whereby the latter is considerably crooked making it difficult to follow, thereby interfering with the planting of the seeds in straight rows.

The object of my present improvement is to overcome this difficulty and this I accomplish by locating the marking device at a suitable lateral distance from the machine, but in a plane cutting the vertical axis of the machine, at right angles to the direction of travel. Under these circumstances the swinging of the tongue back and forth whereby the machine is caused to turn slightly upon its vertical center, will cause the marker to form an arc tangential to a line of travel passed through the marking device; and a given movement of the machine on its vertical center will cause but slight irregularity in the direction of the mark, as compared with the irregularity resulting from a marking device located either in the front or rear of the vertical axis of the machine as heretofore explained.

Having outlined my improved construction as well as the function it is intended to perform, I will proceed to describe the same in detail reference being made to the accompanying drawing in which is illustrated an embodiment thereof.

In this drawing, Figure 1 is a top view of a machine equipped with my improvements. Fig. 2 is a similar diagrammatic view illustrating the difference between my improved construction and the old form of construction so far as irregularity in the mark is concerned.

The same reference characters indicate the same parts in both views.

Let the numeral 5 designate the ground wheels; 6 the axle; 7 the seed box and 8 the tongue of a seeder or planter of ordinary construction.

As shown in the drawing my improved marking device consists of an arm 9 pivotally connected with the axle at 10 whereby it may be swung over to cause the marking device 12 located at the outer extremity of the arm, to occupy a position on either side of the machine. The marking device proper is further connected with the machine by means of a rod 13 having one extremity connected with the marking device by means of a universal joint 14, while the other extremity is connected with the tongue as shown at 15. The two joints 14 and 15 are of such character that the marking device may be swung from one side of the machine to the other, whereby it will always extend in the direction from the machine corresponding with the unplanted ground.

In Fig. 1 the marks formed by the marker are indicated by the letter A, while the seed lines are indicated by the dotted and broken lines B and C, respectively. In Fig. 1 the lines B indicate the four rows or seeding lines of the machine as it travels across the field in one direction; while the broken lines C indicate the seeding lines of the machine when traveling across the field in the opposite direction. One of the marks A indicates the mark made by the machine during its previous trip across the field, while the other mark A indicates the mark being formed by the marking device when the machine is guided by the first named mark by so driving the team that the tongue is in line with the latter.

Now referring to Fig. 2, the ground wheels, axle and marking device are designated by the same reference characters as in the previous view. However, in Fig. 2, I have indicated the old form of marking device as well as my improved form, the old form being composed of a bar 16 extending rearwardly from the center of the axle and an arm 17 extending laterally at right angles to the rear extremity of the arm 16. At the outer extremity of the arm 17 is located the marking device 18. Now assuming that the machine is given a partial rotation on its vertical axis indicated at 19, all of the parts of the machine will be thrown from the full line position to the dotted line position. In this case my improved marking device 12 will describe the dotted arc 20 while the old marking device 18 will describe the broken arc 21. If these arcs are extended using as a radius the distance from the vertical axis 19 to the respective marking devices, I find that the arc 21 crosses the line of the machine's direction at a considerable angle, assuming the movement of the machine on its vertical axis to be of the degree indicated by the dotted lines. In other words the marking device in the old form of construction is caused to vary by the said movement of the machine, a distance equal to the distance between the lines 22 at the lower left hand corner of Fig. 2; while the variation of my improved marking device for the same movement of the machine, only equals the distance between the dotted lines 24 at the upper left hand corner of the same figure. Hence this diagrammatic view taken in connection with the previous explanation, indicates the advantage of my improved marker over the old or original marker construction.

Having thus described my invention, what I claim is:

The combination with a seeding or planting machine mounted on two wheels, of a marking device having an arm whose inner extremity is connected with the center of the axle at the point of intersection of two vertical planes arranged at right angles to each other, one of said planes passing through the axis of the wheels, a runner to which the outer extremity of the arm is rigidly attached at a point lying substantially in the produced vertical plane cutting the axis of the wheels of the machine and a rigid connection between the runner and the tongue, substantially as described.

In testimony whereof I affix my signature in presence of two witnesses.

AUGUST F. BUCK.

Witnesses:
H. MAYFIELD,
D. IVAN CLONE.